(12) United States Patent
Johansen

(10) Patent No.: US 7,014,804 B2
(45) Date of Patent: Mar. 21, 2006

(54) ENVIRONMENTALLY FRIENDLY INSULATING MATERIAL AND METHOD FOR MANUFACTURE THEREOF

(76) Inventor: Fridtjov Johansen, Hoybratenvein 11A, N-1055, Oslo (NO)

( * ) Notice: Subject to any disclaimer, the term of this patent is extended or adjusted under 35 U.S.C. 154(b) by 192 days.

(21) Appl. No.: 10/622,451

(22) Filed: Jul. 21, 2003

(65) Prior Publication Data

US 2004/0051217 A1   Mar. 18, 2004

Related U.S. Application Data

(62) Division of application No. 09/746,560, filed on Dec. 26, 2000.

(30) Foreign Application Priority Data

Dec. 23, 1999  (NO) .................................. 19996457
Nov. 22, 2000  (NO) .................................. 20005915

(51) Int. Cl.
  *B29C 59/00*  (2006.01)
  *B29C 67/24*  (2006.01)
(52) U.S. Cl. ....................... 264/115; 264/116; 264/118; 264/122; 264/123
(58) Field of Classification Search ........ 264/109–128, 264/115, 116, 118, 122, 123, 140
See application file for complete search history.

(56) References Cited

U.S. PATENT DOCUMENTS

| | | | |
|---|---|---|---|
| 4,101,335 A | 7/1978 | Barrable | |
| 4,296,168 A | 10/1981 | Ambrose | |
| 4,418,031 A | 11/1983 | Doerer et al. | |
| 5,047,453 A | 9/1991 | Vost et al. | |
| 5,227,227 A | 7/1993 | Boulanger | |
| 5,401,567 A | 3/1995 | Knobloch | |
| 5,723,209 A | 3/1998 | Borger et al. | |
| 5,952,248 A * | 9/1999 | Horton | 442/138 |
| 6,296,795 B1 | 10/2001 | Buck | |
| 6,743,498 B1 * | 6/2004 | Fourmeux | 428/131 |

FOREIGN PATENT DOCUMENTS

| | | |
|---|---|---|
| DE | 42 23 614 A1 | 2/1994 |
| DE | 43 26 721 A1 | 9/1995 |
| DE | 195 12 767 A1 | 10/1996 |
| DE | 196 02 551 C1 | 6/1997 |
| DE | 197 57 459 A1 | 8/1999 |
| HU | 176337 B | 3/1972 |
| HU | 178122 B | 9/1977 |
| JP | 9011208 | 1/1997 |
| JP | 9279456 | 10/1997 |
| JP | 11124921 | 5/1999 |
| JP | 11181946 | 7/1999 |
| RU | 2 083 524 C1 | 7/1997 |
| SU | 1158644 A | 5/1985 |

* cited by examiner

*Primary Examiner*—Stephen J. Lechert, Jr
(74) *Attorney, Agent, or Firm*—Browdy and Neimark, PLLC

(57) ABSTRACT

This invention relates to an environmentally friendly insulating material, or more specifically an insulating mat for insulating buildings, houses etc. and a method for the manufacture thereof. The mat is non-allergenic and almost 100% recyclable, and is characterized in that it consists of fabric remnants which are shredded into shoddy, mixed with a fibrous polyester with a low melting point and flax fibres to form a homogeneous mass, which is then moulded into the desired shape and then heat-treated until the polyester fibres melt, bonding the fabric and flax fibres together.

12 Claims, 1 Drawing Sheet

Figure 1:
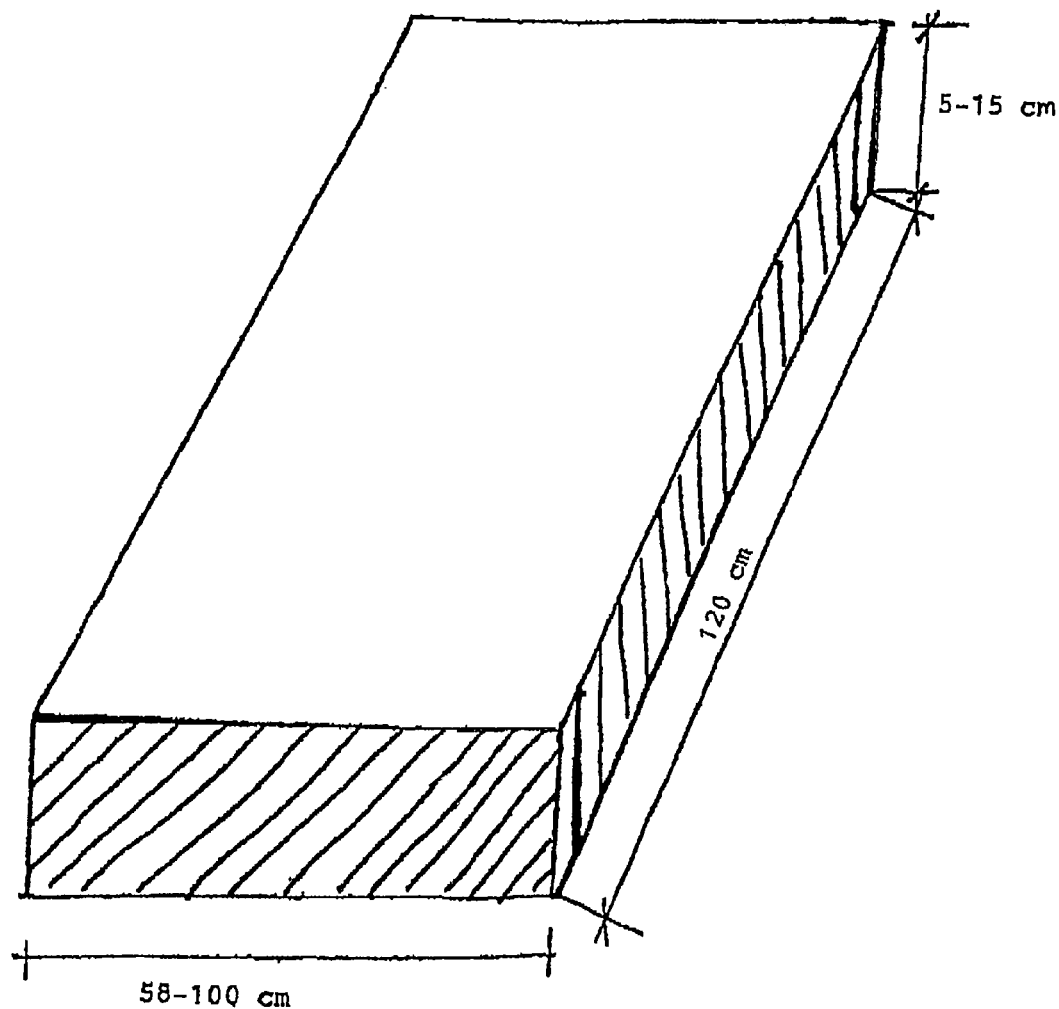

ENVIRONMENTALLY FRIENDLY INSULATING MATERIAL AND METHOD FOR MANUFACTURE THEREOF

RELATED APPLICATIONS

This is a division of copending parent application Ser. No. 09/746,560 was filed Dec. 26, 2000.

FIELD OF THE INVENTION

This invention relates to an environmentally friendly insulating material, or more specifically an insulating mat for insulating buildings, houses, etc. and a method for manufacture thereof. The mat is non-allergenic and almost 100% recyclable.

BACKGROUND

Rockwool or glass wool mats are often employed to-day for insulating buildings, houses and other structures. Both of these types of insulating mats are encumbered with environmental disadvantages.

Glass wool, e.g., is manufactured by melting standard glass to which is added some additives which give the glass a low level of thermal conductivity, whereupon the glass is drawn out by means of rapidly rotating winding machines into long thin threads. The threads are collected and bonded by means of a phenolic adhesive into, e.g., insulating mats of varying thickness and rigidity. Rockwool is produced in an analogous manner, but here it is rocks which are melted, lime is added and drawn out in rapidly rotating winding machines. In this case too a phenolic adhesive is employed to form insulating mats. Both of these processes require high temperatures of many hundreds of degrees Celsius, and thereby a relatively high energy consumption, and they use non-renewable resources such as rock and sand respectively.

A known problem in the building industry is that both types of insulating mats can cause allergic reactions such as itching, smarting and sore throats, particularly while working on laying the mats. In addition, the fibres are hard and will penetrate the skin to a certain extent, thus producing mats which are prickly and cause discomfort to bare skin. These fibre needles can cause a great deal of irritation as well as being difficult to remove from the skin. It is therefore necessary to use respiratory protection and fabrics which provide complete cover while working with insulating mats. This makes the building process both more complicated and more expensive.

Another problem is that after a time the adhesive will become dry and crumble up, with the result that rock or glass fibre in the insulating material will work loose. Thus in many cases fibre will seep into the building through cracks etc., impairing the quality of the indoor air. Several cases are known where an unacceptably high level of glass fibre and/or rockwool fibre has been found in the filters of the ventilation systems of, e.g., primary schools. There is now a suspicion that glass fibre may have a carcinogenic effect. Another consequence of the atomisation of the adhesive is that after a time the insulating mats will sag, thus impairing the insulating material's insulating power. This is detrimental from an environmental point of view since it results in the mats being unsuitable for recycling, and since a reduction in the insulation of the buildings results in increased energy consumption for heating.

There is therefore a need for new types of insulating materials which can solve the above-mentioned problems, and which are environmentally friendly both with regard to people and the environment in general.

THE PRIOR ART

From the car industry the process is known of making insulating mats by shredding used clothes into shoddy and gluing it with acrylic adhesive to form thin hard sheets. This method, however, will only work for thin sheets since thick layers of shoddy held together by adhesive will inevitably be split up during processing. The sheets, moreover, will be too rigid to be practical for use as building insulation.

THE OBJECT OF THE INVENTION

A main object of this invention is to provide an insulating material which is environmentally friendly during production and use.

It is also an object of this invention to provide an insulating material which is asthma and allergy-preventive, both for production workers and users of buildings which are insulated by the product.

A further object of this invention is to provide an insulating material which employs a waste product as a raw material and which can be completely recycled after its wear life has ended.

SPECIFICATION OF THE INVENTION

The objects of the invention can be achieved by what will be apparent in the attached claims and what will be apparent in the following description of the invention.

The object of the invention can be achieved by the insulating material being produced from used fabrics which are shredded into shoddy, mixed with flax fibres and a polyester with a low melting point into a homogeneous mass which is moulded into the desired shape, e.g. mats, and then heat-treated until the polyester melts and binds the fibres together to form the insulating material. The proportions of mixture depend on the desired degree of rigidity for the finished product and will normally be within 5–50 percent by weight flax fibres and 5–50 percent by weight polyester, preferably 15–40 percent by weight flax fibres and 10–30 percent by weight polyester, and most preferably 20–30 percent by weight flax fibres and 15–20 percent by weight polyester. The rest is composed of shoddy.

It is also possible to replace up to 30–40 percent by weight of the shoddy with wastepaper/cardboard. In this case the paper/cardboard is shredded to the same degree of fineness as the fabrics and then mixed with the fabric fibres, the flax fibres and the polyester into a homogeneous mass. The mass is then moulded into the desired shape and heat-treated until the polyester melts and binds the fibres together to form the insulating material.

All kinds of used fabrics may be used. Fabrics which provide long fibres, such as wool etc. are particularly suitable, but the invention works very well with fabrics with shorter fibres, such as cotton and synthetic fabrics. On account of the requirements for fireproof insulation material, fabrics containing inflammable materials, e.g. plastic materials such as oilskins etc. should be completely or partially avoided. For this invention the use is preferred of collected used clothes and fabric remnants from the furniture industry.

The use is preferred of flax fibres of the type sold under the trade name "Flax Tow" or "Scutching Tow", since these fibres are cheap, long and strong, and provide the insulating material with good flexibility. These fibres come from the outer part of the flax plant's stem, and are a by-product of the combing of the flax plant's fibrous material.

Any polyester may be employed as long as it has a low melting point, i.e. it melts at temperatures below 300° C., and preferably below 200° C. It is most preferred to use polyesters which melt in the range of 120–170° C. It is best to avoid using polyesters which have a substantially lower melting point than 120° C. since the insulating material has to withstand some degree of heating without the risk of the polyester losing the adhesive effect by melting and causing the fibres in the insulation material to overflow and/or become packed together. Another factor is that the lower the melting point, the greater the vapour pressure of the polyester, and the more undesirable the release of gas which will come from the polyester. As examples of suitable polyesters, the following bicomponent polyesters may be mentioned: Trevira T252 with dtex-range from 2.2–4.4 from Hoechst Trevisa GmbH, Germany; Celbond Type 255 or 256 with dtex 3.3 from Hoechst Celanese Corp., USA; Terital TBM with dtex 4.4 from Enichem, England; and Wellbond with dtex range 5.3–10 from Wellman International Ltd., Ireland.

In order to give the insulating material approved fire resistance, fire-retardant agents should be added. Fire tests have been carried out on mats of the insulating material according to the invention by SINTEF Building and Environmental Technology—Norway's fire-technology laboratory, to which has been added 2.5 kg Station 1 per $m^3$ of insulating material, corresponding to 0.25 l/$m^2$ for a 10 cm thick mat. Station 1 is a commercially available water-based non-poisonous fire-retardant agent. Other fire-retardant agents may also be used as long as they are non-poisonous and environmentally friendly. The tests document that mats made of the insulating material according to the invention satisfy the criteria for loose insulating material according to standard NT FIRE 035 and according to *Report HO-1/94, Plastic in buildings* from the State Constructional Engineering Department. This is a standard which applies broadly speaking to all buildings. The exception is buildings which are classified in fire class 4, action class 3 or risk class 6.

Tests have also been carried out on the mats by Mycoteam as which show that the insulating material can be employed under normal moisture conditions without the risk of the growth of mould. For applications where there is a risk of exceptional amounts of moisture, fungicides may, of course, be added to the insulating material.

The use of used fabrics/fabric waste and possibly wastepaper/cardboard which are shredded into shoddy means that this insulating material is particularly environmentally friendly. In the first place, the raw material is recycled materials which at present are usually either incinerated in rubbish plants or deposited in rubbish dumps. The invention thereby helps to reduce the amount of waste and the emission of climate gases. In Norway 3500–4000 tons of fabric waste is discarded every year. It is a known fact that fabric waste will emit methane gas during decomposition. Methane gas is a potent greenhouse gas if it is released into the atmosphere. Incineration of fabric waste also emits climate gases, in this case $CO_2$. For this reason, e.g., a law has been introduced in Germany ordering recycling of textiles, and work is underway to introduce a similar law for the entire EU area.

The material is also advantageous in that it requires a relatively small amount of energy during production. For example, the energy requirement for a 1 $m^{2,}$ 15 cm thick insulating mat according to the invention is approximately 4 kWh, while for a corresponding Glava mat the energy consumption is approximately 14 kWh or 3.5 times as much.

This is clearly a significant saving. In addition, the present invention will save energy since insulating mats made of this material will keep their shape for the foreseeable future, thus keeping the insulating power intact over a very long period. This is not the case with many of to-day's insulating materials. Thus the requirement for energy for heating of the buildings/objects employing the insulating material will be reduced compared to that required for present day insulating materials.

In addition, the insulating material according to the invention is user-friendly, i.e. not hazardous to the building workers and the subsequent occupant(s) since the material does not cause allergy or asthma, it emits almost no noxious gases and produces little dust. The insulating material is therefore particularly suitable for sufferers from asthma and allergy and will help to improve the indoor climate for these people. Several cases have been documented of how present day insulating materials of the glass and/or rock wool type will release dust in the form of fibres which are injurious to health. The fibres are released particularly during the construction of the building and remains thereof are left in the building for a long time despite cleaning, but may also be released over time since the adhesive binding the fibres together into a mat will gradually dry up. The latter effect results in the indoor climate of the building being supplied with fibrous dust and the thinning out/sagging of the insulating material, thus impairing the building's insulation over time.

A further factor is that the insulating material manufactured according to the invention is as good as 100% recyclable. Used insulating material is almost as well suited as fabric waste as a raw material for new insulating mats, and may very well be mixed into it during the production of insulating material according to the invention. The fact that the material can be recycled will also help to reduce the amount of waste which has to be deposited. The building industry is a major contributor to waste for depositing.

DETAILED DESCRIPTION OF THE INVENTION

The invention will now be described in greater detail with reference to FIG. 1 and a preferred embodiment.

FIG. 1 illustrates an example of an insulating mat according to the invention.

An example of the production of a preferred insulating mat.

Collected used clothes, so-called scrap cloth, was torn to pieces in a Picker 800 machine. The machine also picked out buttons, zips, metal buckles etc. from the fabric remnants. The torn-up fabrics were then passed to a three-cylinder shoddy machine. The shoddy machine shredded the fabric remnants into fabric fibres, or so-called shoddy. The shoddy was passed to a weight distributor where approximately 15 percent by weight polyester and 20 percent by weight flax fibres, based on the total weight of the mass, were added to the shoddy before the addition of 2.5 kg of Station 1 fire-retardant agent per cubic metre of fabric mass. After weighing, the mass (shoddy, flax fibres, polyester and fire-retardant agent) were passed to a drum in the weight distributor where air was blasted through the mass in order to form a homogeneous and aerated shoddy. The shoddy mass was then passed to a mat former which formed a mat (see FIG. 1) with dimensions 0.15×1.20×0.58 $m^3$, and which in the next stage was passed to a smelting furnace at a temperature of approximately 170° C. The high temperature in the furnace caused the polyester fibres in the shoddy to melt, thereby bonding the fabric fibres together and forming an insulating mat which has approximately the same degree of rigidity as a Glava glass wool mat.

A mat of this kind was tested by the Norwegian Building Research Institute and was given the characteristic indicated in Table 1.

The mat's heat conductivity was measured at around 0.036–0.037 W/mK, which is as good as the leading insulating materials on the market to-day.

In cases where cardboard/paper are also used as raw material, this is added in the Picker machine. It has the capacity to tear both cardboard, paper and fabric waste. Otherwise, the method is entirely analogous with the above example.

Even though the invention is exemplified as a mat with specific measurements, it is obvious to a person skilled in the art that the insulating material according to the invention can easily be moulded in every conceivable geometric shape and with all conceivable dimensions in such a manner that they too are within the concept of the invention. However, it is preferred that for use in buildings, the insulating material is moulded into mats which are 1 m long and where the width is within 58–120 cm and the thickness is within 5–15 cm.

TABLE 1

The Norwegian Building Research Institute's characteristic of the insulating material according to this invention

| Property | Characteristic |
| --- | --- |
| Fire resistance | Good[1] |
| Dust and particle release | Good |
| Release of gas | Good |
| Biologically active content | Good |
| Handling comfort | Good |
| Heat insulating properties | Very good |
| Energy consumption during manufacture | Very good |
| Use of recycled materials | Very good |
| Recyclability | Good |
| Weight | Very good |
| Compressibility | Good |
| Moisture absorption | Less good |
| Resistance to biological growth and decomposition | Less good |
| Ageing | Good |
| Mechanical strength | Good |
| Workability | Less good |

[1]The scale is; Bad, less good, good and very good.

What is claimed is:

1. A method for production of an insulating material for buildings, comprising
   providing recycled clothes and/or fabric remnants as starting material,
   shredding the starting material into a homogeneous fibrous shoddy,
   providing a homogeneous fibrous mixture consisting essentially of the homogeneous shoddy together with flax fibers and polyester fibers;
   aerating the homogeneous fiber mixture to form an aerated fibrous mixture;
   forming the aerated mixture into a pre-selected shaped body, and
   heating the shaped body until the polyester at least partly melts and bonds the remaining fibers together to form the insulation material.

2. A method according to claim 1 wherein the recycled clothes are collected used clothes.

3. A method according to claim 1 wherein the fabric remnants are fabric waste from the furniture industry.

4. A method according to claim 1 wherein the collected clothes and/or fabric remnants are torn to bits and all non-fabric items are removed prior to said shredding.

5. A method according to claim 1 wherein the following quantities are mixed into the shoddy, based on the total mass,
   5–50 percent by weight polyester,
   5–50 percent by weight flax fibers from fabric remnants, and
   up to 2.5 kg of fire-retardant agent 1 per $m^3$ of shoddy mass.

6. A method according to claim 1, further comprising adding cardboard and/or paper to the fabric remnants in a quantity of up to 40 percent by weight based on the total mass.

7. A method according to claim 1 wherein said polyester fibers have melting point in the range of 100–300° C. and a dtex value in the range of 2–10.

8. The method of claim 6 wherein the percent by weight of polyester is 10–30%, and the percent by weight of flax is 15–40% by weight, and wherein said polyester have a melting point in the range of 100–200° C. and a dtex value in the range of 2.5–6.

9. The method of claim 6 wherein the percent by weight of polyester is 15–20%, and the percent by weight of flax is 20–30% by weight, and wherein said polyester has a melting point in the range of 120–170° C. and a dtex value in the range of 3–5.

10. A method according to claim 5, further comprising adding cardboard and/or paper to the fabric remnants in a quantity of up to 40 percent by weight based on the total mass.

11. The method of claim 10 wherein the percent by weight of polyester is 10–30%, and the percent by weight of flax is 15–40% by weight, and wherein said polyester have a melting point in the range of 100–200° C. and a dtex value in the range of 2.5–6.

12. The method of claim 10 wherein the percent by weight of polyester is 15–20%, and the percent by weight of flax is 20–30% by weight, and wherein said polyester has a melting point in the range of 120–170° C. and a dtex value in the range of 3–5.

* * * * *